US012493268B1

(12) United States Patent
LaRue et al.

(10) Patent No.: US 12,493,268 B1
(45) Date of Patent: Dec. 9, 2025

(54) SYSTEM AND METHOD FOR IRRIGATION MANAGEMENT USING MACHINE LEARNING WORKFLOWS

(71) Applicant: Valmont Industries, Inc., Omaha, NE (US)

(72) Inventors: Jacob L. LaRue, Owasso, OK (US); Andrew Carritt, Fremont, NE (US); Joshua M. Dixon, Elkhorn, NE (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 18/406,290

(22) Filed: Jan. 8, 2024

Related U.S. Application Data

(63) Continuation of application No. 17/865,858, filed on Jul. 15, 2022, now Pat. No. 11,868,100, which is a continuation-in-part of application No. 15/994,260, filed on May 31, 2018, now Pat. No. 11,429,071.

(60) Provisional application No. 62/513,479, filed on Jun. 1, 2017.

(51) Int. Cl.
  *G05B 13/04* (2006.01)
  *A01G 25/09* (2006.01)
  *A01G 25/16* (2006.01)
  *G05B 13/02* (2006.01)

(52) U.S. Cl.
  CPC ......... *G05B 13/041* (2013.01); *A01G 25/092* (2013.01); *A01G 25/16* (2013.01); *G05B 13/0265* (2013.01)

(58) Field of Classification Search
  CPC .............. G05B 13/041; G05B 13/0265; A01G 25/092; A01G 25/16
  See application file for complete search history.

(56) References Cited

U.S. PATENT DOCUMENTS

| | | | |
|---|---|---|---|
| 5,696,671 A | * | 12/1997 | Oliver ................. A01G 25/167 239/69 |
| 6,337,971 B1 | | 1/2002 | Abts |
| 6,512,992 B1 | | 1/2003 | Fowler et al. |
| 7,584,053 B2 | | 9/2009 | Abts |

(Continued)

FOREIGN PATENT DOCUMENTS

| | | | |
|---|---|---|---|
| EP | 0431744 A2 | 6/1991 | |
| WO | WO-0015987 A1 * | 3/2000 | ........... A01G 25/092 |
| WO | 2017085557 A1 | 5/2017 | |

OTHER PUBLICATIONS

Courault. D et al. "Review on estimation of evapotranspiration from remote sensing data; From empirical to numerical modeling approaches" Irrigation and Drainage Systems, vol. 19, No. 3-4; Nov. 2005, 28 pages.

(Continued)

*Primary Examiner* — Chad G Erdman
(74) *Attorney, Agent, or Firm* — Milligan PC LLO

(57) ABSTRACT

The present invention provides a system and method which includes a machine learning module which analyzes data collected from one or more sources such as UAVs, satellites, span mounted crop sensors, direct soil sensors and climate sensors. According to a further preferred embodiment, the machine learning module preferably creates sets of field objects from within a given field and uses the received data to create a predictive model for each defined field object based on detected characteristics from each field object within the field.

20 Claims, 12 Drawing Sheets

(56) References Cited

U.S. PATENT DOCUMENTS

| | | | |
|---|---|---|---|
| 8,321,061 B2* | 11/2012 | Anderson | E03B 3/28 62/126 |
| 8,739,830 B2* | 6/2014 | Bradbury | A01G 25/16 239/69 |
| 8,924,031 B1* | 12/2014 | Evett | A01G 25/16 239/69 |
| 9,131,642 B2 | 9/2015 | Groeneveld | |
| 9,140,824 B1* | 9/2015 | Mewes | A01D 91/00 |
| 9,880,537 B2 | 1/2018 | Mewes et al. | |
| 11,825,778 B1 | 11/2023 | Stephens | |
| 2004/0117070 A1 | 6/2004 | Barker | |
| 2006/0027677 A1 | 2/2006 | Abts | |
| 2007/0186830 A1 | 8/2007 | Fraisse et al. | |
| 2010/0032495 A1 | 2/2010 | Abts | |
| 2012/0048965 A1 | 3/2012 | Malsam | |
| 2013/0211717 A1* | 8/2013 | Abts | A01G 25/092 701/485 |
| 2015/0040473 A1* | 2/2015 | Lankford | A01G 25/092 47/58.1 SC |
| 2015/0060580 A1 | 3/2015 | Welch | |
| 2015/0061888 A1 | 3/2015 | Lankford et al. | |
| 2015/0129680 A1 | 5/2015 | Abts et al. | |
| 2016/0205877 A1 | 7/2016 | Rooney et al. | |
| 2016/0267203 A1 | 9/2016 | Christensen et al. | |
| 2017/0038749 A1* | 2/2017 | Mewes | G05B 19/042 |
| 2017/0101103 A1* | 4/2017 | Foster | A01B 63/11 |
| 2017/0127625 A1* | 5/2017 | Hattar | A01G 25/16 |
| 2017/0339851 A1 | 11/2017 | Miller | |
| 2017/0349060 A1* | 12/2017 | Abts | A01G 25/092 |
| 2018/0020611 A1* | 1/2018 | LaRowe | A01G 9/249 701/2 |
| 2018/0184600 A1 | 7/2018 | Charling et al. | |
| 2019/0021245 A1 | 1/2019 | Thatcher | |
| 2019/0165716 A1 | 5/2019 | Parod et al. | |
| 2019/0235091 A1 | 8/2019 | Thatcher | |
| 2020/0383283 A1 | 12/2020 | Thatcher et al. | |

OTHER PUBLICATIONS

International Application Serial No. PCT/US18/35400, International Search Report mailed Aug. 29, 2018, 3 pgs.

Jumk. de-Webprojects, "Annulus Sector Calculator"; Article [online] Retrieved from the Internet <URL: https://rechneronline.de/pi/annulus-sector.php. Dec. 23, 2015, 1 page.

* cited by examiner

SYSTEM AND METHOD FOR IRRIGATION MANAGEMENT USING MACHINE LEARNING WORKFLOWS

RELATED APPLICATIONS

The present application is a continuation-in-part of U.S. patent application Ser. No. 15/994,260 filed May 31, 2018 which claims priority to U.S. Provisional Application No. 62/513,479 filed Jun. 1, 2017. Further, the present application claims priority to U.S. Provisional Application No. 62/858,366 filed Jun. 7, 2019.

BACKGROUND AND FIELD OF THE PRESENT INVENTION

Field of the Present Invention

The present invention relates generally to a system and method for irrigation system management and, more particularly, to a system and method for using machine learning to model and design workflows for an irrigation system.

Background of the Invention

The ability to monitor and control the amount of water, chemicals and/or nutrients (applicants) applied to an agricultural field has increased the amount of farmable acres in the world and increases the likelihood of a profitable crop yield. Known irrigation systems typically include a control device with a user interface allowing the operator to monitor and control one or more functions or operations of the irrigation system. Through the use of the user interface, operators can control and monitor numerous aspects of the irrigation system and the growing environment. Further, operators can receive significant environmental and growth data from local and remote sensors.

Despite the significant amounts of data and control available to operators, present systems do not allow operators to model or otherwise use most of the data or control elements at their disposal. Instead, operators are limited to using intuition and snapshots of available data streams to make adjustments to their irrigation systems. Accordingly, despite the large amounts of data created, the decision-making process for growers has not significantly changed in several decades.

Outside the field of irrigation, a number of machine learning methods have been developed which enable supervised and unsupervised learning models based on defined sets of data. For example, support vector machines (SVMs) allow for a supervised learning model which uses associated learning algorithms that analyze data used for classification and regression analysis. Accordingly, an SVM training algorithm is able to build a model using, for instance, a linear classifier to generate an SVM model. When SVM and other types of models can be created, they may be used as predictive tools to govern future decision making.

In order to overcome the limitations of the prior art, a system is needed which is able to collect and integrate data from a variety of sources. Further, a system and method is needed which is able to use the collected data to model, predict and control irrigation and other outcomes in the field.

SUMMARY OF THE PRESENT INVENTION

To address the shortcomings presented in the prior art, the present invention provides a system and method which includes a machine learning module which analyzes data collected from one or more sources such as historical applications by the irrigation machine, UAVs, satellites, span mounted crop sensors, field-based sensors and climate sensors. According to a further preferred embodiment, the machine learning module preferably creates sets of field objects (management zones) from within a given field and uses the received data to create a predictive model for each defined field object based on characteristic data for each field object within the field.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Reference is now made in detail to the exemplary embodiments of the invention, examples of which are illustrated in the accompanying drawings. Wherever possible, the same reference numbers will be used throughout the drawings to refer to the same or like parts. The description, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. As used throughout this application, the word "may" is used in a permissive sense (i.e., meaning "having the potential to'), rather than the mandatory sense (i.e. meaning "must").

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code such as R, Python and/or Excel. Further, the present invention teaches the use of processors to perform the functionalities and processes described herein. As such, the terms "computer," "system," "processor," and/or "controller" are understood to mean the computer chips or processing elements that execute the computer code needed for the performance of a specific action.

Additionally, the functions of the disclosed embodiments may be implemented on one computer or shared/distributed among two or more computers in or across a single or multiple networks or clouds. Communications between computers implementing embodiments can be accomplished using any electronic, optical, or radio frequency signals, transmitted via power line carrier, cellular, digital radio, or other suitable methods and tools of communication in compliance with known network protocols.

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

Figure 1:
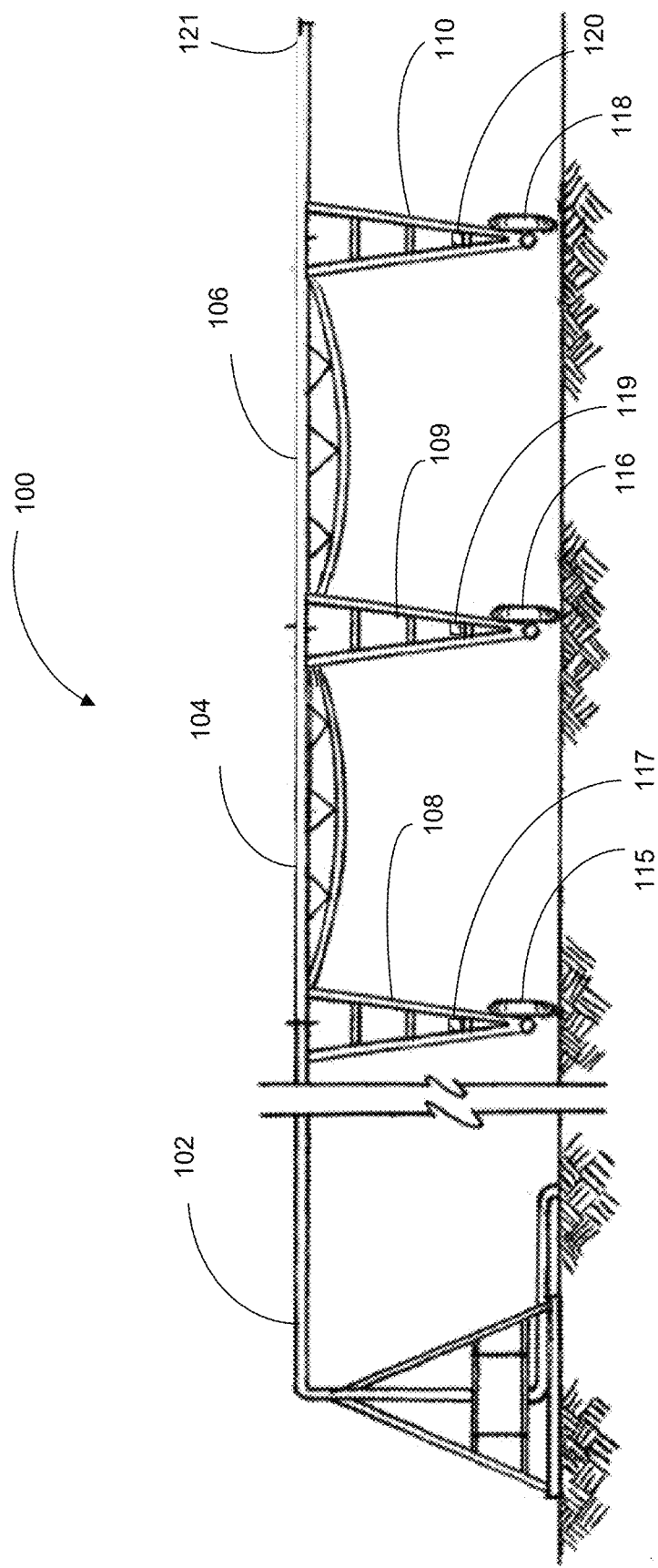
FIG. 1 shows an exemplary irrigation system for use with the present invention.

FIGS. 1-11 illustrate various embodiments of irrigation systems which may be used with example implementations of the present invention. As should be understood, the irrigation systems shown in FIGS. 1-11 are exemplary systems onto which the features of the present invention may be integrated. Accordingly, FIGS. 1-11 are intended to be purely illustrative and any of a variety of systems (i.e. fixed systems as well as linear and center pivot self-propelled irrigation systems; stationary systems; corner systems) may be used with the present invention without limitation. For example, although FIG. 1 is shown as a center pivot irrigation system, the exemplary irrigation system 100 of the present invention may also be implemented as a linear irrigation system. The example irrigation system 100 is not intended to limit or define the scope of the present invention in any way. According to further preferred embodiments, the present invention may be used with a variety of motor types such as gas powered, DC powered, switch reluctance, single phase AC and the like. Still further, the exemplary embodiments of the present invention are primarily discussed with respect to direct spray irrigation methods. However, the methods and systems of the present invention may be used with any methods of delivering applicants without limitation. For example, further delivery methods used by the present invention may include methods such as drip, traveling gun, solid set, flood and other irrigation methods without limitation.

With reference now to FIG. 1, spans 102, 104, 106 are shown supported by drive towers 108, 109, 110. Further, each drive tower 108, 109, 110 is shown with respective motors 117, 119, 120 which provide torque to the drive wheels 115, 116, 118. As further shown in FIG. 1, the irrigation machine 100 may preferably further include an extension/overhang 121 which may include an end gun (not shown).

Figure 3:
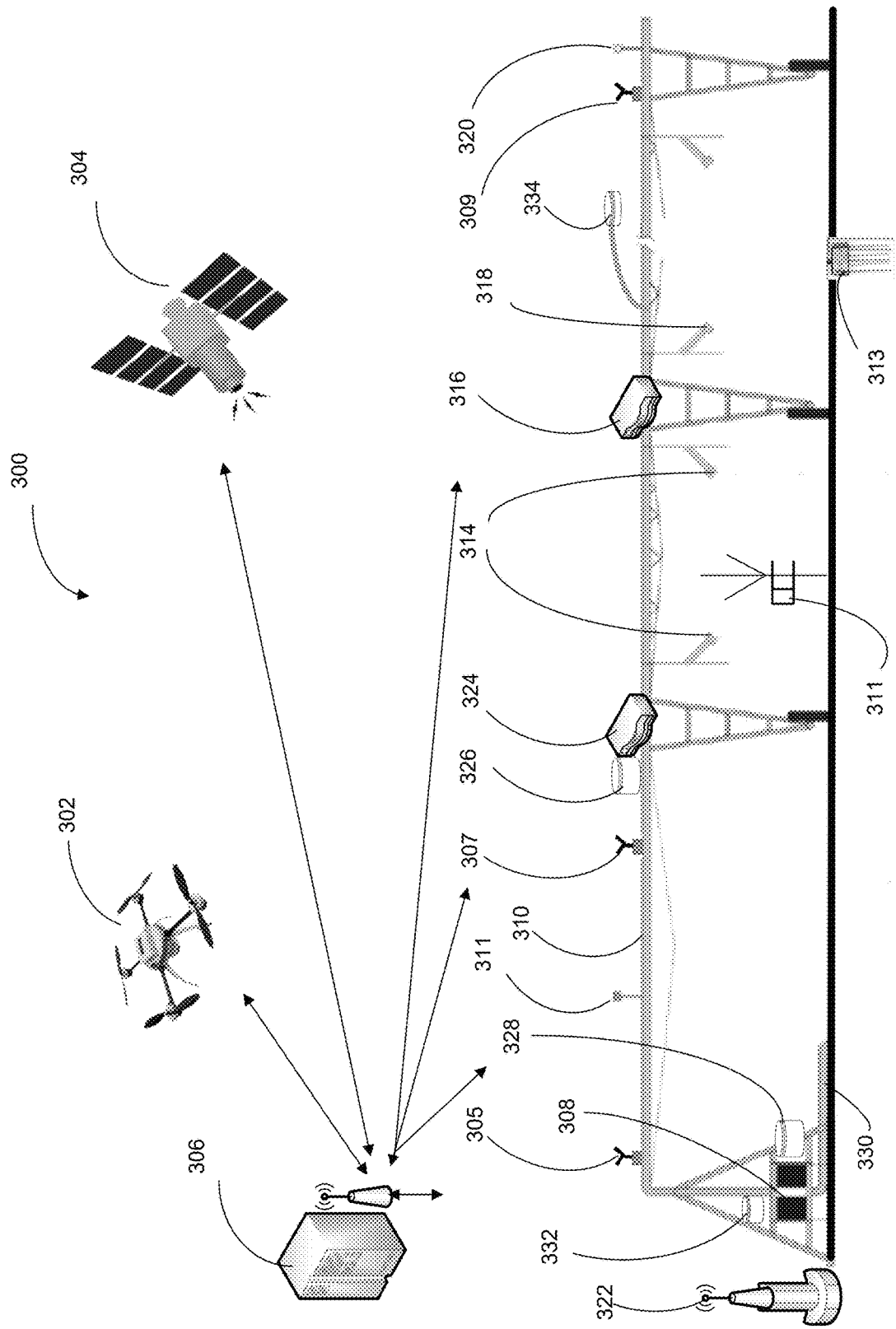
FIG. 3 shows an exemplary irrigation system with a number of exemplary powered elements are included in accordance with further preferred embodiment of the present invention.

As shown, FIG. 1 provides an illustration of an irrigation machine 100 without any added powered elements and sensors. With reference now to FIG. 3, an exemplary system 300 is shown in which a number of exemplary powered elements are included. As shown in FIG. 3, the present invention is preferably implemented by attaching elements of the present invention to one or more spans 310 of an irrigation system which is connected to a water or well source 330. As further shown, the exemplary irrigation system further preferably includes transducers 326, 328 which are provided to control and regulate water pressure, as well as drive units 316, 324 which are preferably programed to monitor and control portions of the irrigation unit drive system.

Further, the system of the present invention preferably further includes elements such as a GPS receiver 320 for receiving positional data and a flow meter 332 for monitoring water flow in the system. Further, the system of the present invention preferably includes a range of sensors and may receive a range of sensor input data from a variety of sources as discussed further herein. As discussed with respect to FIG. 4A below, these sensors and inputs include any number of onboard sensors, in situ sensors, remote/offsite sensors, and land survey data as well as manufacturer/grower and/or specialist-provided measurements or specifications.

With reference again to FIG. 3, representative indirect crop sensors 314, 318 are shown which may collect a range of data (as discussed below) including soil moisture levels. Additionally, the sensors 314, 318 may further include optics to allow for the detection of crop type, stage of grown, health, presence of disease, rate of growth and the like. Additionally, the system may preferably further include one or more direct sensors 311 which may be directly attached to a plant to provide direct readings of plant health and status. Additionally, one or more direct soil sensors 313 may also be used to generate soil moisture, nutrient content or other soil-related data. For example, preferred soil sensors 313 may record data related to a variety of soil properties including: soil texture, salinity, organic matter levels, nitrate levels, soil pH, and clay levels.

The detection system may further include a climate station 322 or the like which is able to measure weather features such as humidity, barometric pressure, precipitation, temperature, incoming solar radiation, wind speed and the like. The system may also include a wireless transceiver/router 311 and/or power line carrier-based communication systems (not shown) for receiving and transmitting signals between system elements.

Additionally, the system may include integrated suites of sensors 334 for monitoring aspects of the climate, ground and crop status. For example, the suite of sensors 334 may include a precipitation detector 403 which preferably may detect forms and rates of precipitation. According to a further preferred embodiment, the precipitation detector 403 may further include sensors to determine the drop size and distribution of detected rainfall, dew, hail and other types of precipitation. The exemplary integrated sensor suite element 334 of the present invention may preferably include an accelerometer which may detect the tilt, orientation and acceleration of the sensor suite element 334. Still further, the sensor suite element 334 may further include a GPS chip or the like. Additionally, the sensor suite element 334 of the present invention may include a radiometer to determine the long wave and short wave incoming solar radiation and photosynthetically active radiation. Additionally, the sensor suite element 334 may include a spectrometer such as a seven-band spectrometer or the like. Additionally, the exemplary sensor suite element 334 may include internal communications chips and a solar panel to separately power the sensor suite 334 or any other sensors discussed herein.

Figure 2:
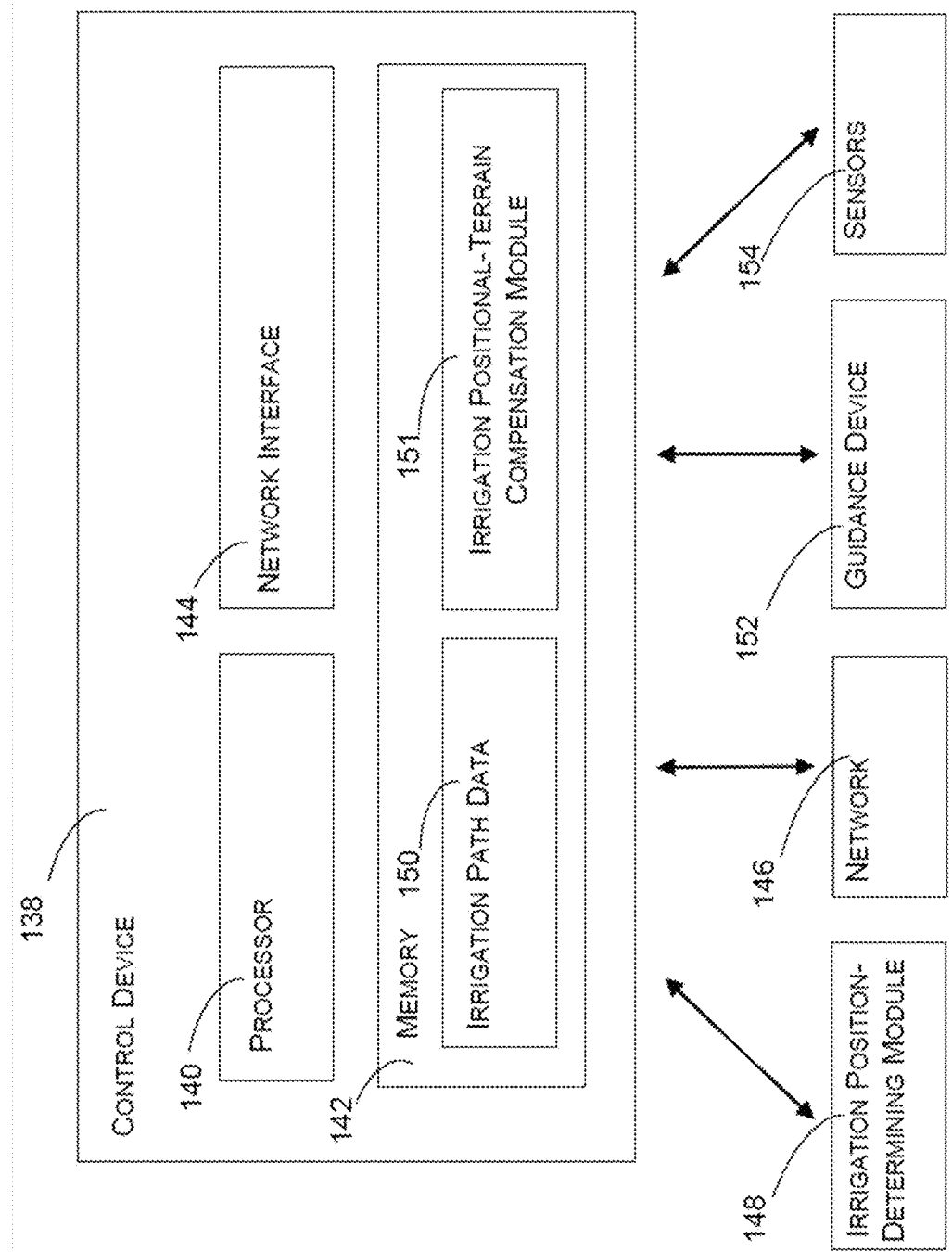
FIG. 2 shows a block diagram illustrating the exemplary processing architecture of a control device in according with a first preferred embodiment of the present invention.

With reference now to FIG. 2, an exemplary control device 138 which represents functionality to control one or more operational aspects of the irrigation system 100 will now be discussed. As shown, the exemplary control device 138 includes a processor 140, a memory 142, and a network interface 144. The processor 140 provides processing functionality for the control device 138 and may include any number of processors, micro-controllers, or other processing systems. The processor 140 may execute one or more software programs that implement techniques described herein. The memory 142 is an example of tangible computer-readable media that provides storage functionality to store various data associated with the operation of the control device 138 such as a software program and code segments mentioned above, or other data to instruct the processor 140 and other elements of the control device 138 to perform the steps described herein. The network interface 144 provides functionality to enable the control device 138 to communicate with one or more networks 146 through a variety of components such as wireless access points, transceivers power line carrier interfaces and so forth, and any associated software employed by these components (e.g., drivers, configuration software, and so on).

In implementations, the irrigation position-determining module 148 may include a global positioning system (GPS) receiver, a LORAN system or the like to calculate a location of the irrigation system 100. Further, the control device 138 may be coupled to a guidance device or similar system 152 of the irrigation system 100 (e.g., steering assembly or steering mechanism) to control movement of the irrigation system 100. As shown, the control device 138 may further include a positional-terrain compensation module 151 to assist in controlling the movement and locational awareness of the system. Further, the control device 138 may preferably further include multiple inputs and outputs to receive data from sensors 154 and monitoring devices as discussed further below.

With further reference to FIG. 3, according to a further preferred embodiment, the system of the present invention may further include distributed data collection and routing hubs 305, 307, 309 which may directly transmit and receive data from the various span sensors to a machine learning module 306 provided on a remote server 306 which receives a number of inputs from the sensors of the irrigation system 300. In this embodiment, the machine learning module 306 preferably includes service-side software which may be accessed via the internet or other network architecture. Alternatively, the machine learning module 306 and other aspects of the present invention may include client-side software residing in the main control panel 308 or at another site. Regardless, it should be understood that the system may be formed from any suitable combination of software, hardware, networked and/or remote elements configured to implement the features of the present invention.

According to a further preferred embodiment, the systems of the present invention preferably operate together to collect and analyze data. According to one aspect of the present invention, the data is preferably collected from one or more sources including imaging and moisture sensing data from UAVs 302, satellites 304, span mounted crop sensors 318, 314, as well as the climate station 322, in-ground sensors 313, crop sensors 311, as well as data provided by the control/monitoring systems of the irrigation machine 100 itself (e.g. as-applied amount, location and time of application of irrigation water or other applicant, current status and position of irrigation machine, machine faults, machine pipeline pressures, etc.) and other system elements. Preferably, the combination and analysis of data is continually processed and updated.

According to further preferred embodiments, the control/monitoring systems of the irrigation machine 100 may include oil sensors units within each drive unit. These oil sensor units may preferably feedback regarding oil quality, usage and whether the drive unit needs an oil change. Additionally, the oil sensor units may monitor oil levels/pressures and monitor for oil leaks, oil viscosity and low/high oil levels. According to a preferred embodiment, the analysis systems of the present may preferably analyze data produced by the control/monitoring systems of the irrigation machine to determine and select system responses. For example, the analysis system may preferably receive machine operational data (e.g. fluid levels, temperatures, viscosities) and analyze this data using data from other machine sensors. According a preferred embodiment, the analysis system may preferably change a measuring threshold range for analyzing data from one or more additional monitored data sources (i.e. oil sensors, water sensors, engine sensors). For example, the analysis system may receive data indicating the ambient temperature of an irrigation machine. The analysis system may preferably use the environment data to adjust a parameter used by the analysis system for monitoring oil level, type or quality. For example, the analysis system may adjust acceptable limits for oil viscosity based on ambient temperatures. In another example, the analysis system may adjust thresholds for determining acceptable water pressure levels based detected wind speeds. Still further, the analysis may lower engine speeds based on detected temperature levels or changes in gradient. This analysis may preferably be performed and adjusted using data from any system as discussed further herein.

According to a further preferred embodiment, imaging data from satellites may be processed and used to generate vegetation indices data such as: EVI (enhanced vegetation index), NDVI (normalized difference vegetation index), SAVI (soil-adjusted vegetation index), MASVI (modified soil-adjusted vegetation index) and PPR (plant pigment ratio) and the like. Other sensors may include any of a variety of electromagnetic, optical, mechanical, acoustic, and chemical sensors. These may further include sensors measuring Frequency Domain Reflectometry (FDR), Time Domain Reflectometry (TDR), Time Domain Transmissometry (TDT), and neutrons.

With reference now to FIGS. 3-11, a preferred method for use of the machine learning module 306 of the present invention will now be discussed. It should be understood that this method of analysis is exemplary, and many other methods may be used without limitation. In particular, the systems and methods of the present invention may function without using field objects or other management zone techniques. As discussed further below, the system may operate independent of these techniques as it receives and reacts to data.

Additionally, in preparation for processing, combining, and evaluating the data collected from the sensor sources as discussed below, the machine learning module 306 will preferably first receive field measurements and dimensions. According to a preferred embodiment, the field dimensions may be input from manual or third-party surveys, from the length of the physical machine or from image recognition systems utilizing historical satellite imagery. Alternatively, the data hubs 305, 307, 309 may preferably further include survey sensors such as GPS, visual and/or laser measurement detectors to determine field dimensions.

Figure 4A:
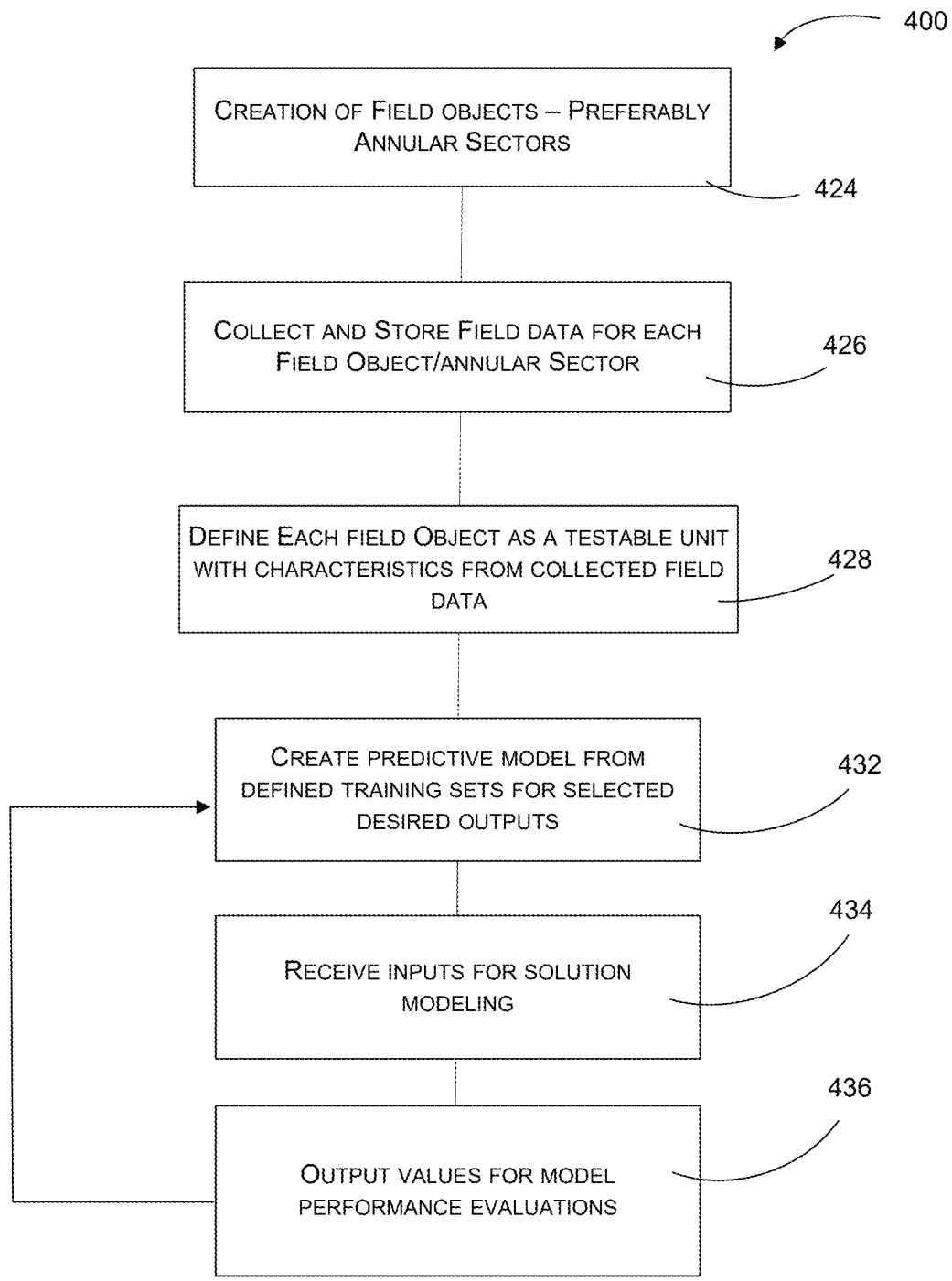
FIG. 4A shows a block diagram illustrating a preferred method in accordance with a preferred embodiment of the present invention.
Figure 5A:
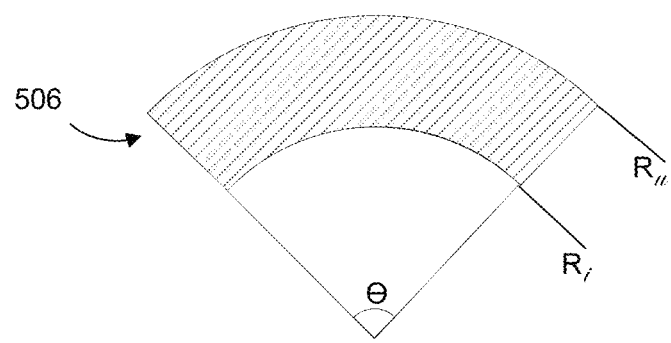
FIGS. 5A-5C show diagrams illustrating examples of field object definitions in accordance with a preferred embodiment of the present invention.

With reference now to FIG. 4A, following the input of the field measurements and dimensions, the machine learning module 306 at step 424 will then preferably create subsections of the entire field and store the created subsections as field objects known as "management zones". As shown in FIG. 5A, according to a preferred embodiment, for a center pivot irrigation machine, the created field objects are preferably created as annular sectors 506 formed as subsections of rings defined by an inner and outer circle of arbitrary radii. These radii may be consistently incremented or variably incremented depending on a variety of factors, including but not limited to the spacing of sprinklers along the machine, varying banked groups of sprinklers or other factors. Circumferentially, the rings are sub-sectioned into annular sectors by radii defined by an angle ($\Theta$).

Figure 5B:
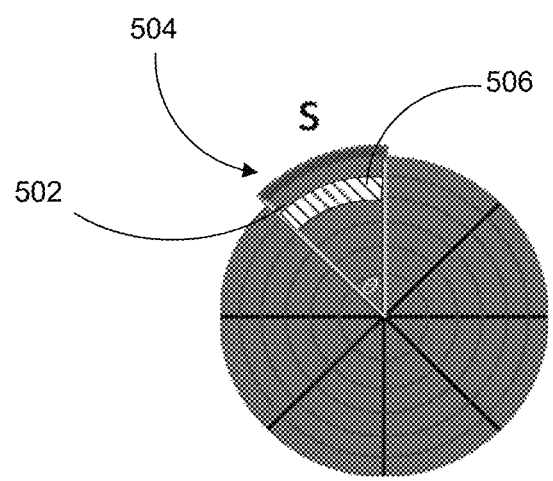
Figure 5C:
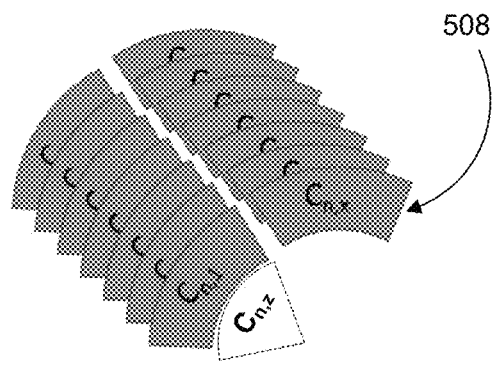

As show in FIG. 5B, the angle ($\Theta$) is preferably defined by an arc length 504 which may be an arbitrary length supplied by the user, the throw radius of the last sprinkler, defined by the resolution of the locational awareness system of the irrigation machine or other factor. Further this arc length need not be consistent from segment to segment within the field area. However, all arc lengths must sum to the circumference of the circle from which they have been sub-sectioned and they may not overlap one another. Similarly, the angles ($\Theta$) must sum to 360 and the locations of these angles ($\Theta$) must be such that the areas encompassed by each angle do not overlap and are always adjacent to other angles (O). As shown in FIG. 5C, the field objects 508 may preferably each be broken down into data sets consisting of columns $C_1$ to $C_n$ where each C is defined as a collection of annular sectors (labeled $C_{n,1}$, $C_{n,2}$, . . . . $C_{n,x}$) and one circular sector (labeled $C_{n,z}$) that fall under an arbitrary arc length(s). Still further, as shown in FIGS. 5A-C, each annular sector may preferably be defined as having:

$$\text{Area} = \frac{\pi \times \Theta}{360}(R_u - R_i)^2$$

where $\Theta$ is the angle formed by adjacent radii separated by the outer circumference length S; $R_u$ is the radius of the outer arc; and $R_i$ is the radius of the inner arc of the annular segment. According to alternative preferred embodiments, the field objects may alternatively be evaluated or assessed on a grid system, polar coordinate system, or use any other spatial categorization system as needed.

With reference again to FIG. 4A, at step 426, data for each defined field object is preferably collected and stored as discussed above. Accordingly, the characteristic data may include data from any of the sensor discussed herein. These may, for example, include:

- Onboard sensory arrays—Including both active and passive systems that describe or measure characteristics of the target locale and/or equipment. Such sensor measurements may include measurements of: direct soil moisture or plant status; crop canopy temperature; ambient air temperature; relative humidity; barometric pressure; long and short-wave radiation; photosynthetically active radiation; rainfall; wind speed; and/or various spectral bands off of the soil and crop canopy. Further, measured sensor data may include data from the irrigation machine control/monitoring systems including: GPS position; pivot/linear systems data; pressure from along the pipeline; status of sprinklers; flow rate (GPM/LPS); valve position; on/off times; pattern dimensions/diameter; voltage; error messages; percent timer setting; direction, forward or reverse; fertigation/chemigation status; water chemistry information; and other operational information.
- Offsite remote sensory—Including aerial, UAV and satellite data or other data acquired from systems not affixed to the target locale or equipment. Such data may include: Geo-tiff images, spectral data including RGB bands, NIR, IR (Thermal), weather-focused radar, radar-based terrain, active and passive microwave imagery for soil moisture and crop growth, and derived indices, such as NDVI, based on these and other individual spectral bands. Further, such data may include evapotranspiration data from satellite heat balance models including infrared heat signatures and data from a crop stress index model. Further, remote data may include climate data from climate stations sufficient to compute or estimate evapotranspiration such as temperature, relative humidity, precipitation, solar radiation, wind speed, rain, weather data and projected conditions. Further, data may include feedback from crop peak ET as well as soil mapping data.
- In situ sensory—May include information such as: soil and buffer pH; macronutrient levels (nitrogen, phosphorus, potassium); soil organic matter (carbon) content; soil texture (clay content); soil moisture and temperature; cation exchange capacity (CEC); soil compaction; depth of any root restricting layers; soil structure and bulk density.
- Land survey data—Including descriptive, numeric and graphic data from public and/or private sources including geographic, geologic and any other physical or physically-derived measure of target locale; field characteristics; soils/EC/CRNP data; topography; field shape; and data from publicly available soil maps and databases.
- Manufacturer's specifications of irrigation system—Pivot characteristics; span configuration; flowrate; maximum allowable inches/acre; required pressure; maximum speed; sprinkler package, endgun or not.
- Grower and/or specialist-provided measurements or specifications—Including but not limited to: soil analysis, soil or water chemistry, geographic analysis, meteorological analysis, irrigation or nutrient schedules or historical operational; yield data; soil water balance calculations; soil moisture in the root zone; soil moisture by depth; soil moisture forecast in root zone; soil moisture forecast by depth; crop species/variety/type; planting date; emergence date; replanting date; critical soil moisture allowable depletion; published crop coefficient curves; privately developed crop coefficient curves; on-premises sensor based determinations of crop growth stage; evapotranspiration calculation data; whole field uniform evapotranspiration estimates; parts of the field evapotranspiration estimates; and whole field variable evapotranspiration estimates.

With reference again to FIG. 4A, at step 428, each field object/annular sector is preferably defined as a discrete data point containing characteristics inherited from field-level data as well as characteristics derived from its relationship to other data points (e.g. neighboring soil types and elevations). In one embodiment, as an example, slopes from adjacent field objects may be utilized to calculate the runoff of excessive rainfall into or out of a specific field object.

At step 432, the created discrete data points are preferably used by the machine learning module 306 to create a predictive module for each discrete data point. According to a preferred embodiment, the machine learning module 306 performs the modeling function by pairing each data point with input/output data for the field object and evaluating the data over time or as a non-temporal set. According to a further preferred embodiment, the performance timelines/observations are then evaluated for a particular output, as part of the entire collection, with the evaluating machine learning how to categorize data points and building an algorithm that accurately reflects the observed performance timelines for the desired output. One or more of these algorithms are then preferably assembled into a solution model which may be used to evaluate new fields in real time for the purpose of assisting growers in optimizing profitability, cash flow, regulatory compliance, water, fertilizer or chemical application efficiency, or any other measurable or intangible benefit as may be required or discovered.

According to a preferred embodiment, the solution model may preferably be created for each management zone (i.e. one or more field objects, annular sectors and/or other irrigable units) of each field. Further, the solution models may preferably be created whole or in part by any number or combination of human-provided heuristics and/or machine-created algorithms. Further, the algorithms may be created by regressions, simulations or any other form of machine/deep learning techniques. According to further preferred embodiments, the solution model of the present invention may be delivered as neural networks, stand-alone algorithms or any combination of learned or crafted code modules or stand-alone programs. Further, the solution model may preferably incorporate live/cached data feeds from local and remote sources.

With further reference now to FIG. 4A, the solution model of the present invention may preferably be delivered to a grower via a push/pull request from content delivery network, point-to-point connection or any other form of electronic or analog conveyance. Further, the system will preferably allow an operator to accept, reject or modify a solution model after review.

Once a model is delivered, at step 434, data inputs are preferably received and provided to the model for evaluation. At step 436, output values are generated as discussed further below. Preferably, the data inputs preferably include acceptance, rejection or modifications of the solution model from the operator and any updated data from any of the list of data inputs discussed above with respect to steps 424-432. Further, the data inputs may include additional data such as grower specified and/or desired data such as: desired direction of travel; base water application depth; variable rate prescription for speed, zone or individual sprinkler; grower chemigation recommendation; chemigation material; chemigation material amount ready for injection; base chemigation application amount per unit area; variable rate prescription for speed, zone or individual sprinkler; irrigation system and/or sensor operational or repair status.

Figure 4B:
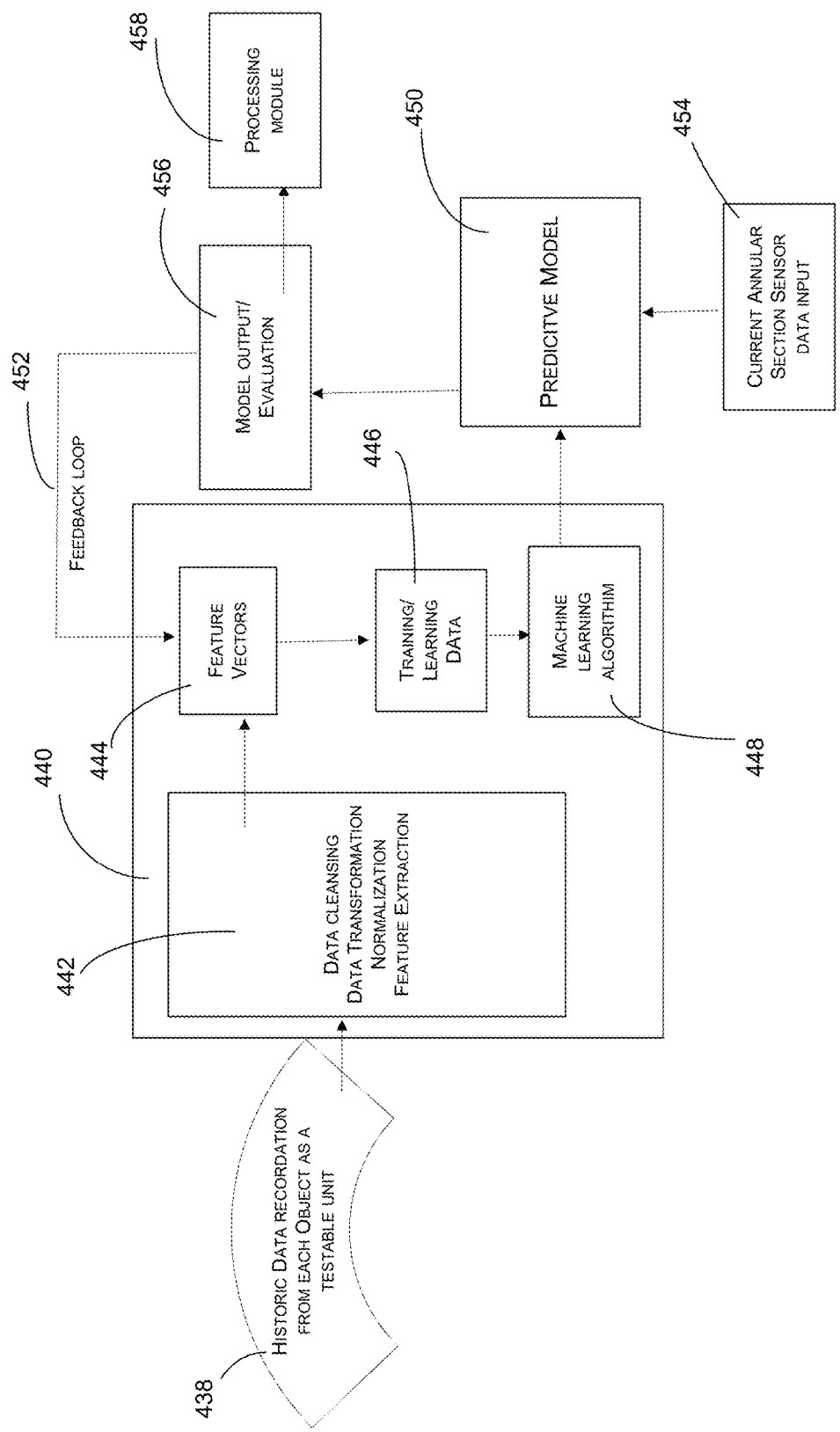
FIG. 4B shows a block diagram illustrating a further preferred method in accordance with a preferred embodiment of the present invention.

With reference now to FIGS. 4A and 4B, an example method for inputting data and outputting modeled values shall now be further discussed. As shown in FIG. 4B, the machine learning module 440 of the present invention may preferably be used to receive historical data 438 (step 428 in FIG. 4A) which may include data recorded over a period of time (i.e. weeks, months, years) for each object within a given field. This historic data is preferably received by the machine learning module 440 and used to create predictive models 450 from defined training sets 446 for selected desired outputs (step 432 in FIG. 4A). To create the predictive models 450, the machine learning module 440 preferably further includes submodules to process the received data 442 including steps such as data cleansing, data transformation, normalization and feature extraction.

Once extracted, the target feature vectors 444 are forwarded to a training module 446 which is used to train one or more machine learning algorithms 448 to create one or more predictive models 450. In the example shown, the predictive model 450 preferably receives current sensor data input 454 (step 434 in FIG. 4A) and outputs model output/evaluation data 456 (step 436 in FIG. 4A) which is provided to a processing module 458 to create system inputs and changes based on the model output 456. At step 452, the output values 456 and current inputs 454 may preferably be fed back into the machine learning module 440 via a feedback loop 452 so that the module 440 may continually learn and update the predictive model 450.

Figure 6:
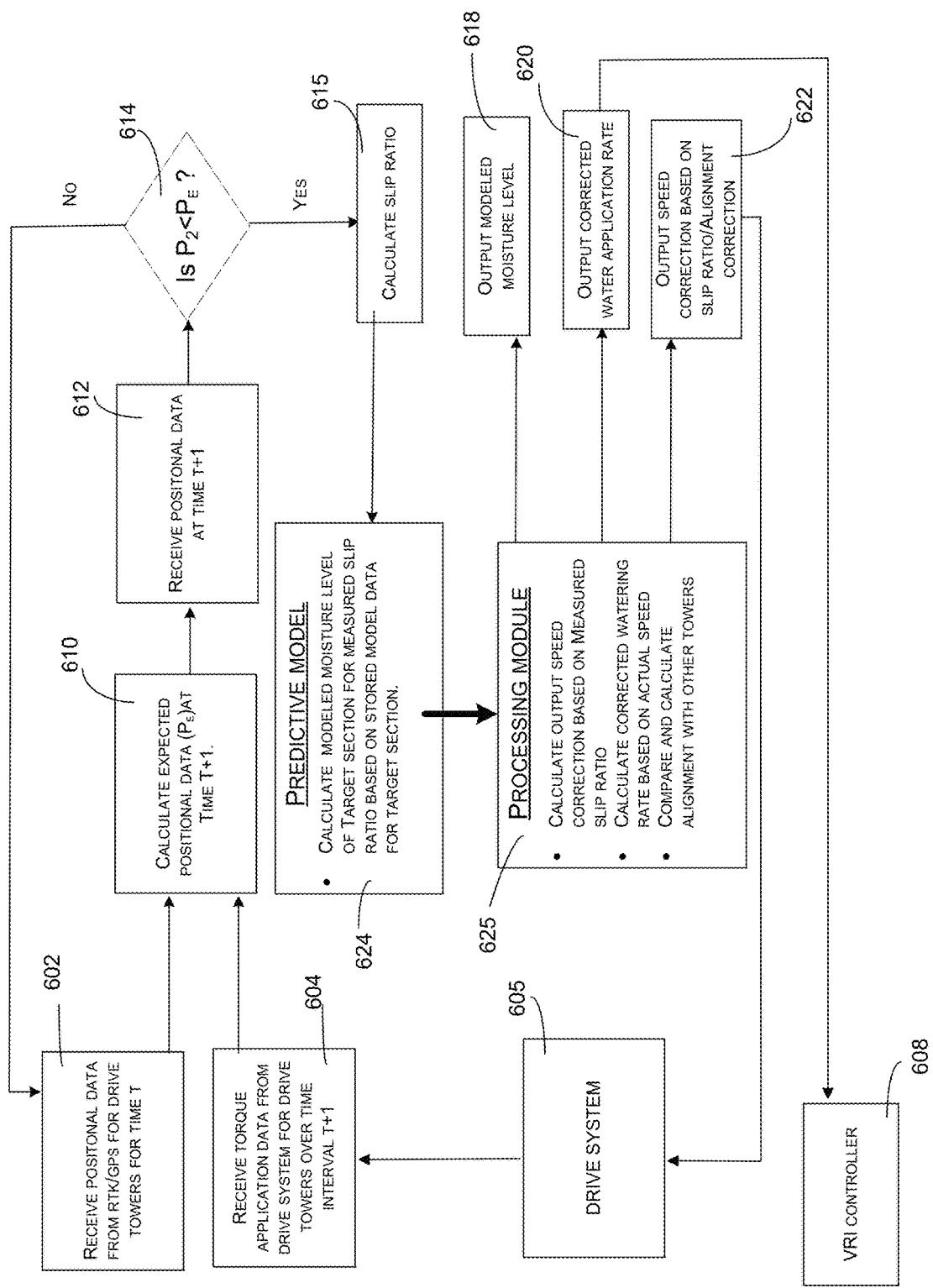
FIG. 6 shows a block diagram illustrating further aspects of an exemplary method and system of the present invention.

With reference now to FIG. 6, a further example application of the present invention shall now be further discussed. As shown in FIG. 6, the example application concerns the adjustment of drive and VRI systems based on detected system data. As shown, the example data fed into the system may include positional data 602 for a given time ($P_1$). Further, example data may include torque application data 604 from the drive system 605 ($D_1$) indicating the amount of torque applied to a drive wheel over a given interval of time (i.e. T+1). With these data inputs, the system of the present invention may preferably calculate the expected position ($P_E$) of the drive tower 610 after the given interval of time (i.e. T+1). Further, the system may preferably receive detected positional data 612 for the location of the drive tower after the given length of time (i.e. $P_2$). At a next step 614, the predicted and detected locations are compared and if $P_2 < P_E$, the system at a next step 615 may further calculate a slip ratio (i.e. $P_2/P_E$) which is then forwarded to the predictive model 624 for analysis.

According to a preferred embodiment of the present invention, the exemplary predictive model 624 shown in FIG. 6 is preferably created and updated by the methods described with respect to FIGS. 4A, 4B and 5 discussed above. As shown in FIG. 6, the exemplary predictive model 624 may calculate moisture levels (i.e. ground moisture levels) from a range of calculated slip ratios. More specifically, the exemplary predictive model 624 may preferably calculate a modeled moisture level for a given annular region based on a measured slip ratio. At next step, the estimated moisture level of the given annular region may then be forwarded to a processing module 625 which then may use the estimated moisture level to make selected adjustments to the irrigation system. For example, the processing module may calculate a speed correction based on the measured slip ratio which is then outputted 622 to the drive system 605. The speed corrections may further include a comparison of speeds between towers and a calculation of alignments between towers. Further, the processing module may calculate a corrected watering rate 620 which may be outputted to the VRI controller 608. Further, the processing module 625 may output an updated moisture level 618 to be included in system notifications or other calculations.

With reference now to FIGS. 7-11, the algorithms of the present invention may preferably be used to analyze a variety of data and to detect and predict problems during field operations. Further, the algorithms of the present invention may command an action or recommend an action to the appropriate personnel (e.g., operator, owner, service person, or dealer). According to another aspect of the present invention, the commands and recommendations may include instructions regarding preventative maintenance. Such notifications may also provide selectable options for an operator which may trigger actions by the irrigation machine as discussed further below.

Figure 7:
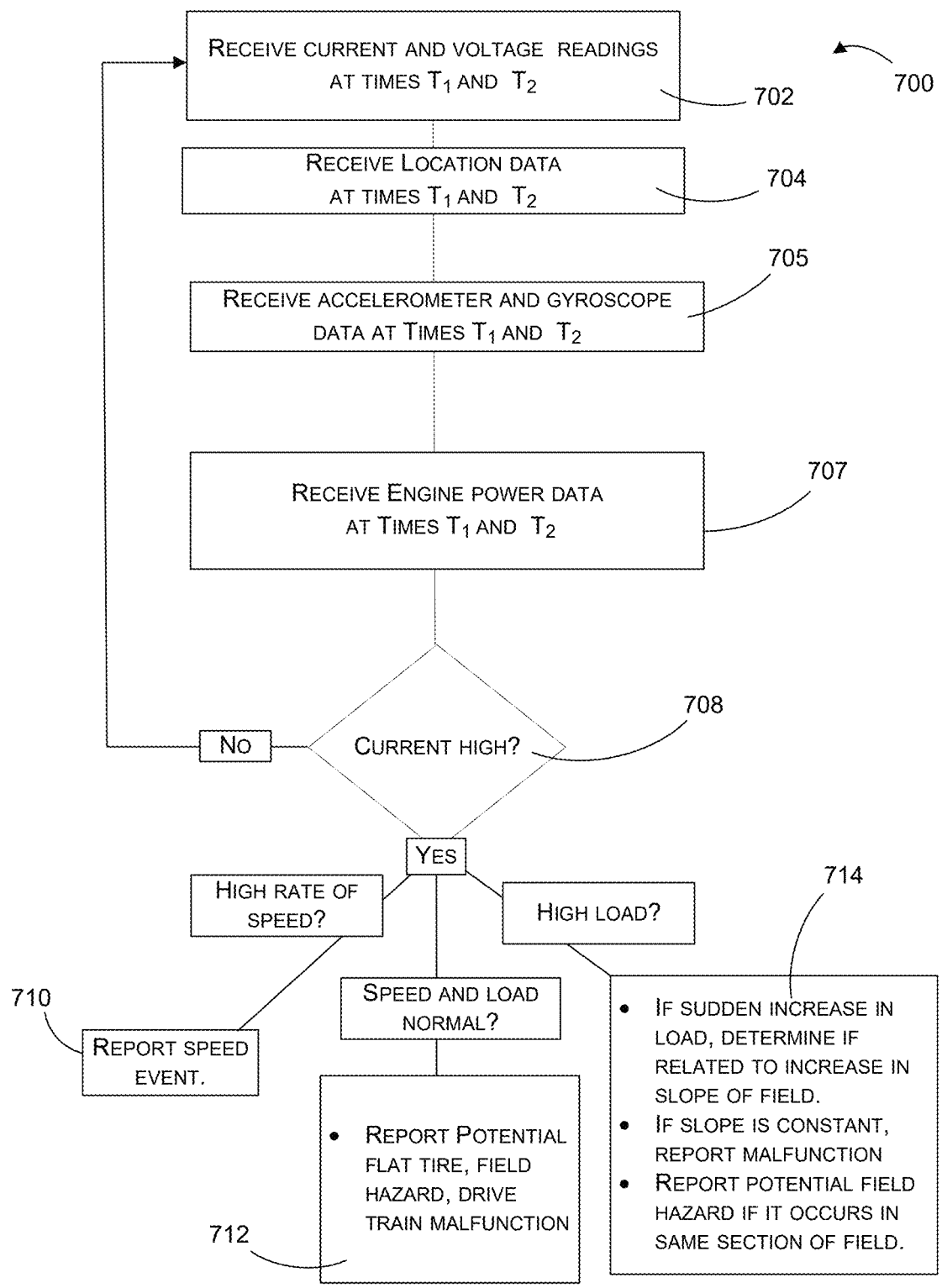
FIG. 7 shows an exemplary algorithm for processing electrical current and voltage data in accordance with a preferred embodiment of the present invention.

With reference now to FIG. 7, an exemplary algorithm 700 for analyzing changes in electrical current and voltage sensor data shall now be discussed. As shown in FIG. 7, at a first step 702, current and voltage data may be recorded and stored at times $T_1$ and $T_2$. At a next step 704, location data for the irrigation machine may be recorded and stored at times $T_1$ and $T_2$. At a next step 705, accelerometer and gyroscope data may be recorded and stored at times $T_1$ and $T_2$. At a next step 707, engine power data may be recorded and stored at times $T_1$ and $T_2$.

At a next step 708, the system may preferably determine whether the measured current exceeds a prescribed level. If NO, the system may return to step 702 to receive new data. If YES, the system preferably determines if the irrigation machine has undergone a high load event. For example, in step 710, the system may analyze accelerometer and/or speedometer data to determine whether the machine traveled at a high rate of speed at the measured times. If so, a notification of the high speed event may be sent. In step 714, the system may further analyze whether a high load event has occurred based on: 1) gyroscopic data indicating high slope in the field; or 2) GPS data and field data indicating rough terrain. In step 714, if the speed and load are determined to be normal, the system at step 712 may trigger a report of a potential flat tire, a field hazard, a drive train malfunction or the like.

In accordance with further aspects, the system of the present invention may alternatively use electrical current data to determine whether a motor or gear box is going bad, or whether there is an issue with a drive unit. Further, the system may analyze recorded power consumption levels for specific areas of a given field at specific speeds. Using this stored data, the system may determine whether a given increase in electrical current represents a repair issue by comparing previous current levels at the same field locations at the same sensed speeds.

According to further aspects, the present invention includes algorithms for analyzing detected phase imbalances to predict a state or winding failure. For example, the algorithms may apply Fourier transformations to detected current waves and then compare their harmonics over time. If the harmonics fall outside of specific thresholds, the system may provide notification that there is a broken rotor winding, rotor pole or the like. The exemplary algorithms may also use the phase imbalances of any running motors to determine the location and nature of any detected power failures. For example, a phase imbalance may be analyzed to determine if a power failure indicates a blown fuse or a one-way contact failure. In another example, a determination may be based on whether a single leg is bad on the power side which preferably may indicate that there was one blown fuse on a given span or unit. The present invention may also include algorithms to compare frequencies involved in the current and voltage waveforms and to correlate the existence of certain frequencies or patterns of frequencies to known failures based on correlation with historical data.

Figure 8:
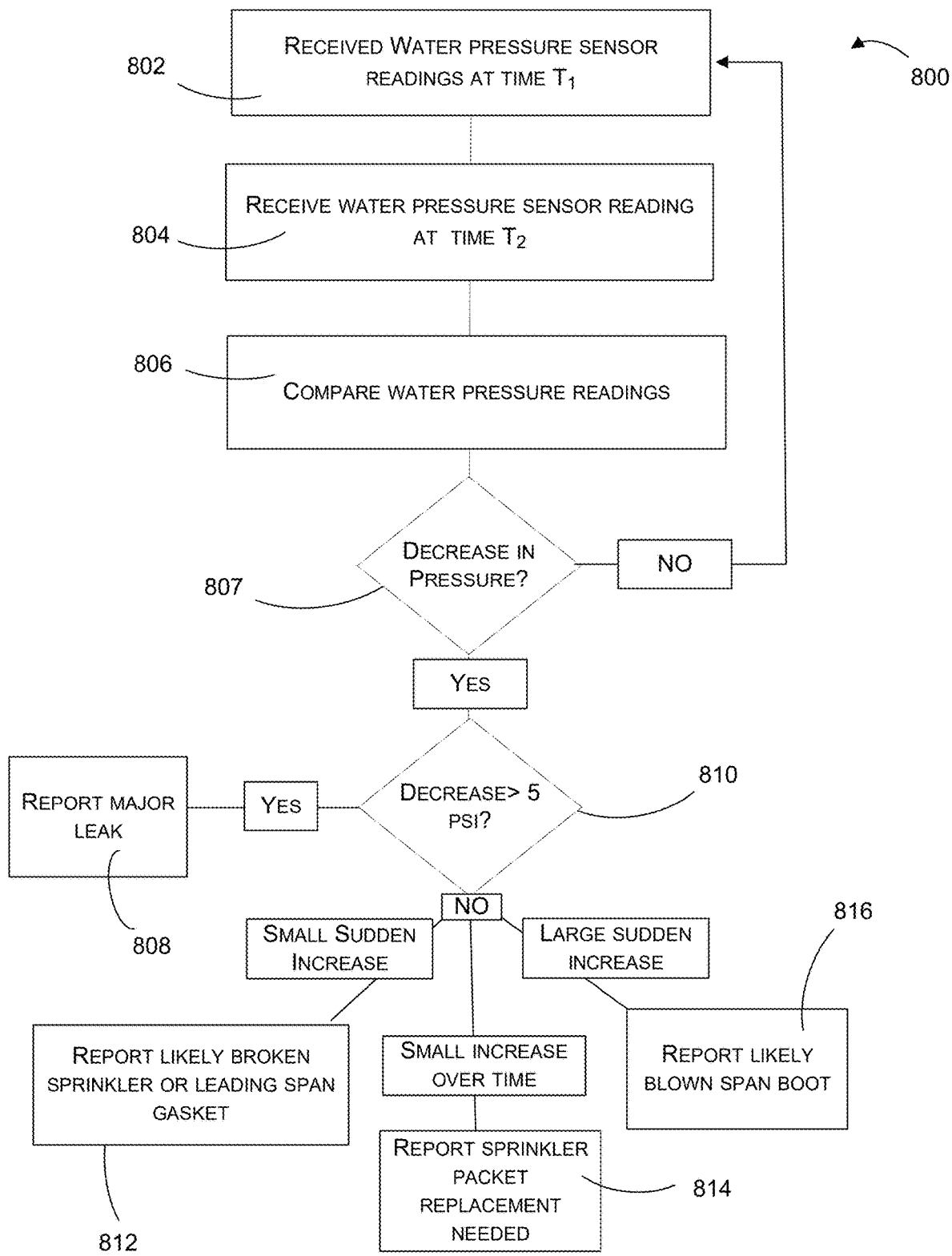
FIG. 8 shows an exemplary algorithm for processing water pressure data in accordance with a preferred embodiment of the present invention.

With reference now to FIG. 8, an exemplary algorithm 800 for analyzing measured water pressure rates shall now be discussed. As shown in FIG. 8, at a first step 802, water pressure sensor readings may be recorded and stored for a first time T1. At a next step 804, water pressure sensor readings may be recorded and stored at a second time T2. At a next step 806, the system may preferably compare the recorded water pressure data at times T1 and T2. At a next step 807, the system preferably determines whether any decrease in water pressure has occurred. If NO, the system returns to step 802 and receives new data. If YES, the system proceeds to step 810 and determines whether the water pressure has decreased by more than 5 psi between times T1 and T2. If YES, the system at step 808 preferably determines that a major water leak has occurred, and the system creates a notification.

If NO, the system analyzes the data further to determine if the increase in water pressure is a 1) small, sudden increase; 2) a small increase over an extended time period; or 3) a large, sudden increase (of less than 5 psi). If the algorithm determines that the pressure increase is small and sudden, the system at step 812 may provide a notification to check for a broken sprinkler, a broken leading span gasket or the like. If the algorithm determines that the pressure increase is small and over an extended time period, the system at step 814 may provide a notification that a sprinkler package replacement may be needed. If the algorithm determines that the pressure increase is large and sudden (but under 5 psi), the system at step 816 may provide a notification to check for a blown span boot or the like.

Figure 9:
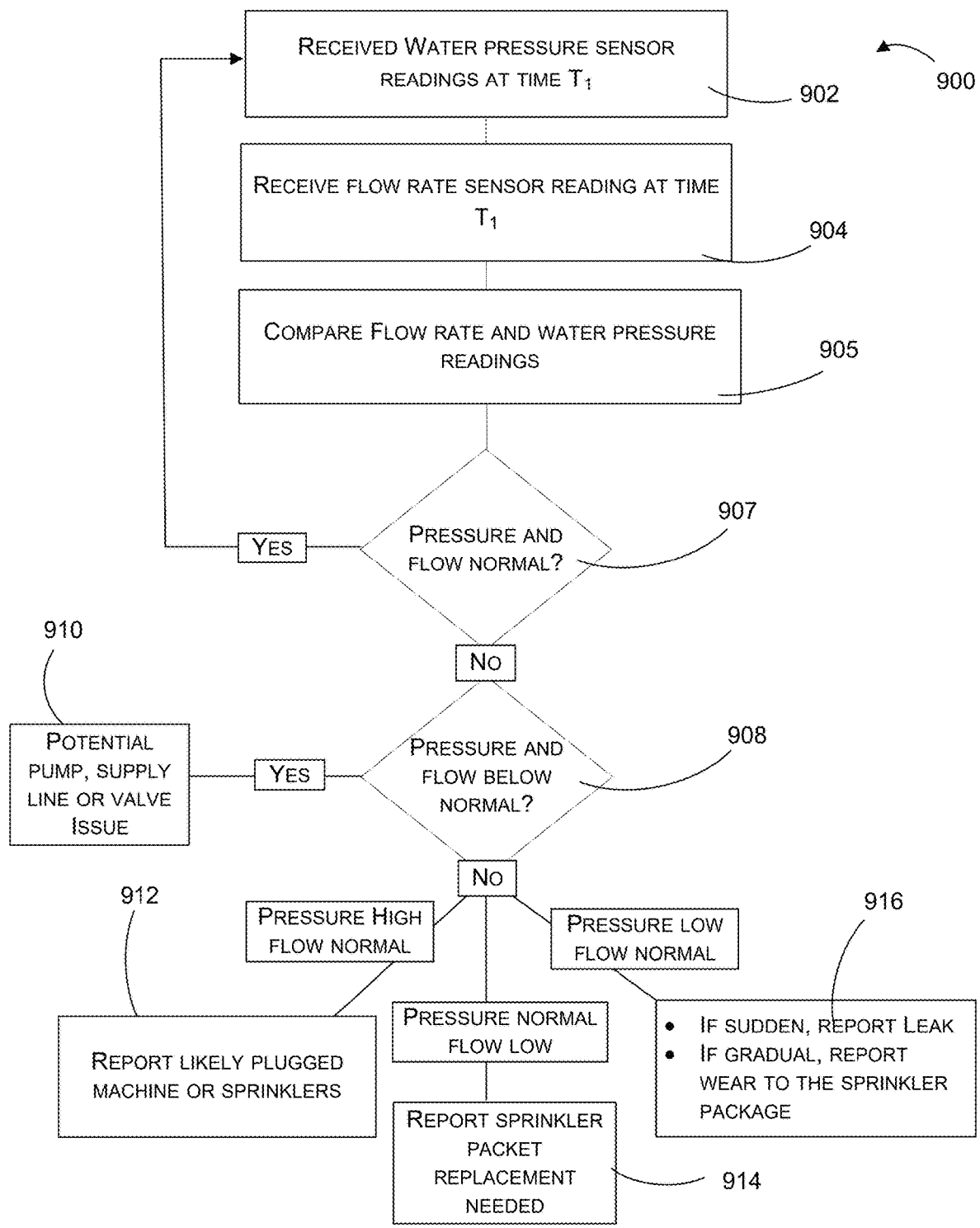
FIG. 9 shows an exemplary algorithm for processing water pressure data and flow rate data in accordance with a preferred embodiment of the present invention.

With reference now to FIG. 9 an exemplary algorithm 900 for analyzing measured water pressure rates and water flow rates shall now be discussed. As shown in FIG. 9, at a first step 902, water pressure sensor readings may be recorded and stored for a first time $T_1$. At a next step 904, water flow sensor readings may be recorded and stored at a time $T_1$. At a next step 905, the system may preferably compare the recorded water pressure and water flow data at time $T_1$. At a next step 907, the system may preferably determine whether both the water pressure rates and the water flow rates are within predetermined limits. If YES, the algorithm returns to step 902 and receives new data. If NO, the algorithm preferably proceeds to step 908 and determines whether both the water pressure and the water flow rates are below normal. If YES, the algorithm proceeds to step 910 and generates a notice regarding a potential water supply issue such as a malfunction at the pump, the supply line or the main supply valve.

If the system at step 908 determines NO, then the algorithm preferably compares the water pressure and flow rates to determine a likely maintenance issue. For example, if the system determines that the pressure is HIGH and the flow is NORMAL, the algorithm at step 912 preferably generates a notice that there is a likely issue with the machine or sprinkler being plugged. Alternatively, if the system determines that the pressure is NORMAL and the flow is LOW, the algorithm at step 914 preferably may generate a notice that sprinkler packet may need replacement. Still further, if the system determines that the pressure is LOW and the flow is NORMAL, the algorithm at step 916 may preferably report a potential leak (if the change is over a short period of time) or report potential wear to the sprinkler package (if the change is over a longer period of time).

Figure 10:
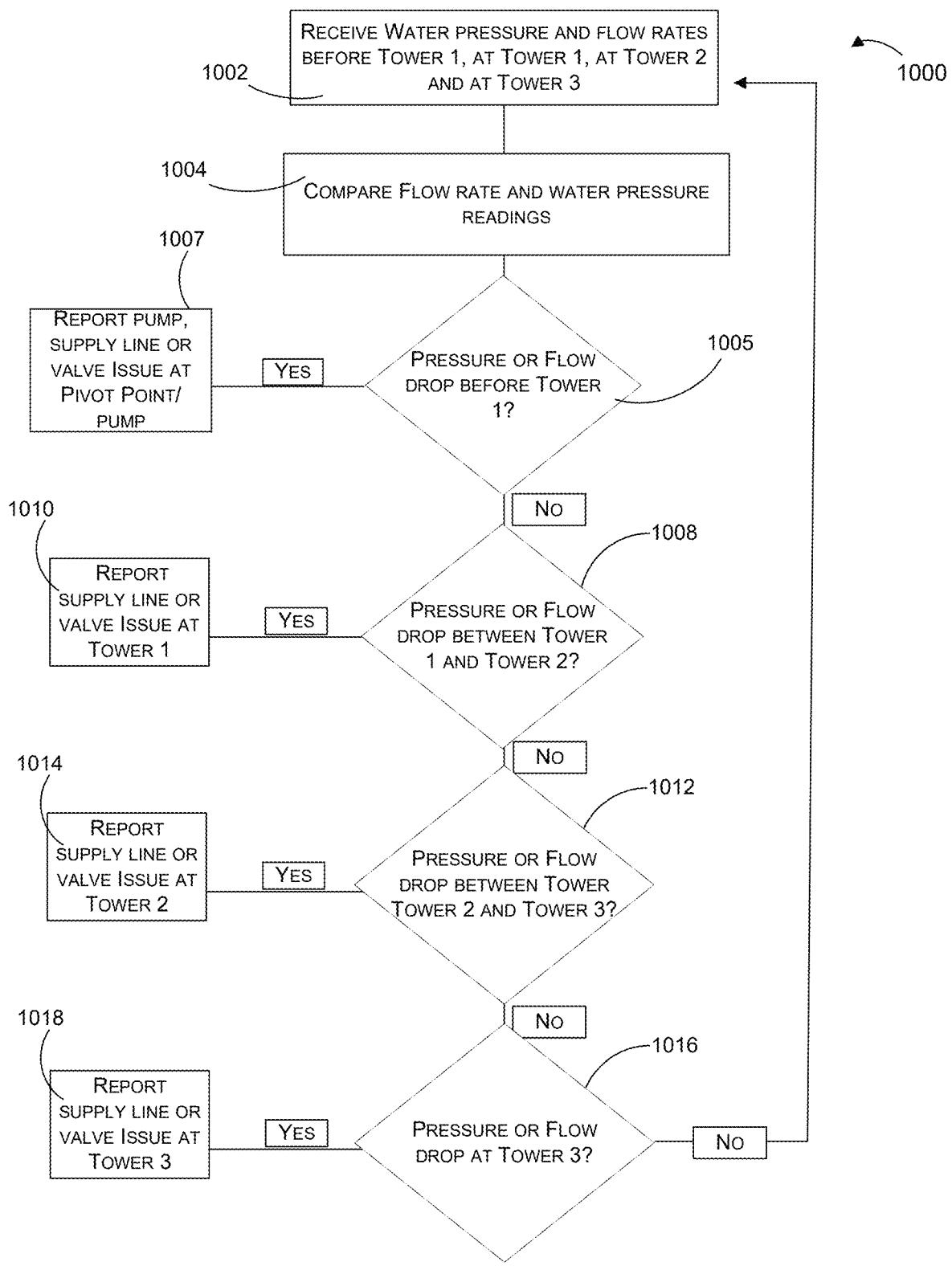
FIG. 10 shows an exemplary algorithm for further processing of water pressure data and flow rate data in accordance with a preferred embodiment of the present invention.

With reference now to FIG. 10, a further exemplary algorithm 1000 is shown which assists operators in locating issues in an irrigation machine. The algorithm 1000 is explained with respect to a system which includes three or more drive towers (Towers 1, 2, and 3). However, it should be understood that the location algorithm may be applied to any set of points within an irrigation system and that the exemplary drive tower points are for illustration only.

As shown in FIG. 10, at a first step 1002, the algorithm preferably first receives water pressure and flow rates before Tower 1, at Tower 1, at Tower 2 and at Tower 3. At a next step 1004, the system may preferably compare the recorded water pressure and water flow readings. At a next step 1005, the algorithm preferably determines whether the pressure or flow rates drop before Tower 1. If YES, the algorithm at step 1007 preferably prepares a notification that a pump, supply line or valve issue is likely present at the pivot point/pump.

If NO, the algorithm preferably proceeds to step 1008 and determines whether the pressure or flow rates drop between Tower 1 and Tower 2. If YES, the algorithm preferably generates at step 1010 a notice that there is a potential water supply issue at Tower 1.

If NO, the algorithm preferably proceeds to step 1012 and determines whether the pressure or flow rates drop between Tower 2 and Tower 3. If YES, the algorithm preferably generates at step 1014 a notice that there is a potential water supply issue at Tower 2.

If NO, the algorithm preferably proceeds to step 1016 and determines whether the pressure or flow rates drop at Tower 3. If YES, the algorithm preferably generates at step 1018 a notice that there is a potential water supply issue at Tower 3. If NO, the system returns again to step 1002 to receive new data.

Figure 11:
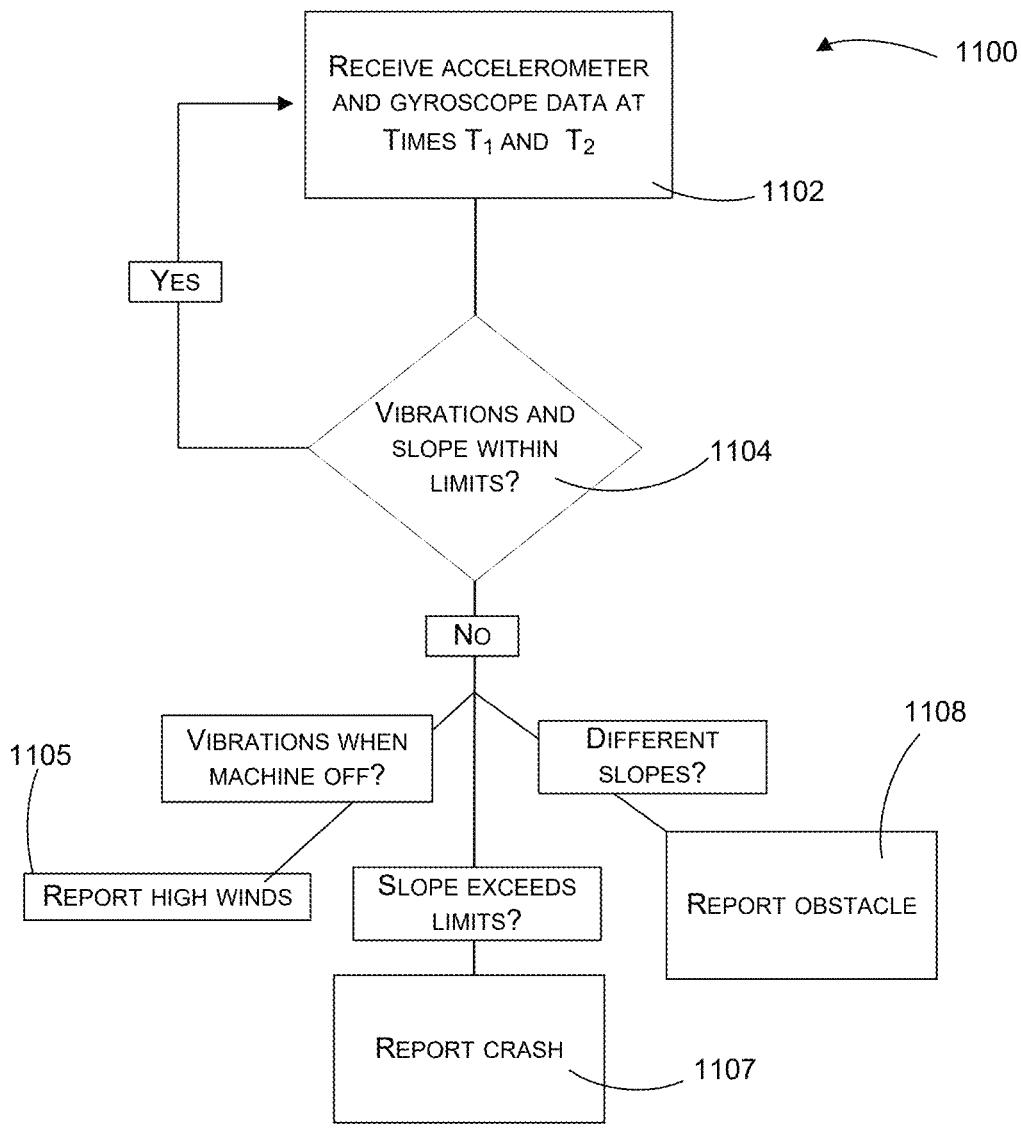
FIG. 11 shows an exemplary algorithm for processing accelerometer and gyroscopic data in accordance with a preferred embodiment of the present invention.

With reference now to FIG. 11, an exemplary algorithm 1100 for analyzing accelerometer and gyroscopic data shall now be discussed. As shown in FIG. 11, at a first step 1102 accelerometer and gyroscopic data may be recorded and stored at times $T_1$ and $T_2$. At a next step 1104, accelerometer and gyroscopic data is analyzed to determine if they both fall with threshold limits. If YES, the system returns to step 1102 and receives new data.

If NO, the algorithm analyzes the accelerometer and gyroscopic data against other stored data. At step 1105, the algorithm may report high winds if the system determines that the machine is vibrating when turned off. At step 1107, the algorithm may report a crash if the slope/tilt indicated by the gyroscopic sensor exceeds specific slope limits. At step 1108, the algorithm may report an obstacle if different slopes are reported from different gyroscopic sensors.

In addition to the exemplary algorithms above, the algorithms of the present invention may analyze and react to a variety of data in many other circumstances including all manner of preventative maintenance. According to a further preferred embodiment, the system of the present invention may also use data for predictive analysis (i.e. using data to model the probability of future events). This preferably may involve utilizing sensor and/or other data to predict when a part or system is likely to fail. An example may involve using the amount of load changes in a given current to determine when winding failure is likely or imminent (e.g., a punch through in the insulation). Another example of predictive maintenance may include monitoring tire pressure to determine when tire failure is likely, and the system preferably may thereafter issue commands to get the machine to a location for maintenance. Depending on detected tire pressures or leak rates, the system preferably may also issue a control command to move the machine to a service road and to notify the customer/dealer. The system preferably may also receive pressure transducer data at each tower and then adjust drive units and/or pump systems to maintain proper pressure across all towers.

In terms of voltage and current, the system may detect a high steering motor current or the like, which the system may determine indicates a likely wheel track. The system may then adjust threshold power and steering levels to prevent damage to the drive unit. For example, the system may compare where the machine is (e.g., based on guidance wire or GPS position) and make the determination to steer less severely to avoid structure damage to the drive unit. The system preferably may also measure steering angle and whether the motor is operating or not to determine if there is a broken steering gearbox or if the machine is steering in an uncommanded state.

Regarding reactive maintenance, the system may preferably include threshold levels for triggering the machine to take programmed actions. For example, the system may detect levels of tilt across an irrigation span and react by shutting down the machine to prevent it from completely tipping over. This type of reaction preferably may be used for any of a variety of detected system data. For example, the system may detect (via GPS or other motion sensors) that the machine is slowing or stopping. In response, the system may react by reducing or turning off one or more valves on the machine to reduce overwatering. The system may also react in a number of other ways including identifying a blown fuse, one-way contact failure or the like. Such a determination may preferably include shutting the machine down and transmitting a notification or alert.

Similarly, flow and pressure sensor data may be used to detect broken boots and valves. Additionally, the system of the present invention may use pressure readings from different locations on a given span to detect the location of each boot and/or valve failure.

With regard to flow sensors, if a given flow sensor detects a change for a given pressure, or the flow starts changing over time at the same pressure, or the pressure starts dropping relative to a same flow, then the system may determine that the sprinkler package or the well pump may be starting to fail or there is an issue at the well input. In response, the system may indicate an alert and may trigger machine shut down.

According to a further preferred embodiment, the system of the present invention may preferably analyze the delta P (i.e. change in pressure) across the spans. From this data, the machine may preferably determine the existence of leaking sprinkler packages, boots, and flanges. The system may also determine a location for the analytically determined leak. According to further preferred embodiments, the system of the present invention may determine the part size and type which needs replacement based on the detected location and the system may respond with a notice or order to a dealer.

It should be understood that the present invention may analyze and model a range of irrigation systems and subsystems and provide custom models for execution based on any received data. The modeling discussed above are purely exemplary. Other modelling outputs may include instructions and/or recommendations for each sub-system including changes to: direction of travel; base water application depth; variable rate prescription for speed, zone or individual sprinkler; grower chemigation recommendation; amount and type of chemigation material; required chemigation material amount ready for injection; base chemigation application amount per unit area; center pivot maintenance and/or repair; sensor maintenance and/or repair status and the like without limitation. Where desired, each modeled output may be automatically forwarded and executed by the irrigation system or sent for grower acceptance/input in preparation for execution.

While the above descriptions regarding the present invention contain much specificity, these should not be construed as limitations on the scope, but rather as examples. Many other variations are possible. For example, the processing elements of the present invention by the present invention may operate on a number of frequencies. Further, the communications provided with the present invention may be designed to be duplex or simplex in nature. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from the present invention as needed.

Accordingly, the scope of the present invention should be determined not by the embodiments illustrated, but by the appended claims and their legal equivalents.

The invention claimed is:

1. A system for controlling a self-propelled irrigation system for use in a field to be irrigated having an area definable into distinct physical sectors, the system having at least one mechanical span and a mechanical drive system configured for moving the span across the field, the system comprising:
   a plurality of onboard sensors physically mounted to the span, the plurality of onboard sensors comprising:
   at least one crop growth sensor configured to directly measure a physical rate of crop growth within the field; and at least one climate sensor configured to directly measure at least one environmental condition selected from the group consisting of humidity, atmospheric pressure, precipitation levels, and ambient temperature;
   a computing device comprising a physical processor and non-transitory computer-readable memory having stored thereon executable instructions forming a machine learning module, wherein the machine learning module is configurable to receive sensor-generated characteristic data associated with each of the physically defined sectors from the onboard sensors;
   wherein the machine learning module is configurable to generate a plurality of digitally stored field objects, wherein each field object corresponds directly to one of the physical sectors of the field and apply a predictive machine learning algorithm to the received characteristic data to generate a predictive irrigation model individually associated with each digitally stored field object;
   wherein the machine learning module is configurable to continuously monitor and generate physical alerts indicating real-time detected changes in water pressure within the irrigation system based on sensor data from the onboard sensors, wherein said alerts trigger automated adjustments to the mechanical operation of the drive system.

2. The system of claim 1, wherein the machine learning module is configurable to receive water pressure data at a first time T1 and a second time T2; wherein the machine learning module is configurable to diagnose and report a determined cause of the water pressure loss based on the amount of water pressure lost over a given period of time.

3. The system of claim 2, wherein the sectors are annular sectors that are formed as subsections of rings defined by an inner and outer circle with the shape preferably bounded by the difference in radial length, and an angle ($\Theta$) derived from two radii connecting to the ends of an outer length L determined by the selected angle ($\Theta$).

4. The system of claim 3, wherein the characteristic data comprise spectral bands generated off of the soil and the crop canopy.

5. The system of claim 4, wherein the characteristic data comprises water chemistry data.

6. The system of claim 5, wherein the characteristic data comprises data regarding the specifications of the irrigation system and its subcomponents.

7. The system of claim 6, wherein the machine learning module further analyzes data regarding soil chemistry, water chemistry and yield data.

8. The system of claim 7, wherein the characteristic data comprises: soil moisture by depth, soil moisture forecast in root zone, and soil moisture forecast by depth.

9. The system of claim 8, wherein the characteristic data further comprises: the chemigation material amount ready for injection, and the base chemigation application amount per unit area.

10. The system of claim 1, wherein the machine learning module is configurable to calculate an amount of runoff for a first field object based at least in part on the calculated slope of one or more adjacent field objects.

11. The system of claim 10, wherein the machine learning module is configurable to trigger a reduction of water applied to the first field object based on the calculated amount of runoff.

12. The system of claim 11, wherein the machine learning module triggers the closing of a first valve to reduce the application of water.

13. The system of claim 1, wherein the system is configurable to detect and analyze phase imbalances to initiate a notice of a system condition.

14. The system of claim 13, wherein the system condition comprises a sub-system failure.

15. The system of claim 14, wherein the sub-system failure comprises a blown fuse.

16. The system of claim 1, wherein the system is configurable to detect and analyze voltage and current waveforms transmitted within the system to initiate a notice of a system condition.

17. The system of claim 16, wherein the system condition comprises a sub-system failure.

18. The system of claim 17, wherein the sub-system failure comprises a blown fuse.

19. The system of claim 14, wherein the system is configurable to adjust a machine operating parameter based on the analysis of voltage or current waveforms.

20. The system of claim 18, wherein the system is configurable to detect a high steering motor current and to adjust threshold power and steering levels based on the detected steering motor current.

* * * * *